UNITED STATES PATENT OFFICE 2,547,501

METHOD OF PREPARING 2-AMINO-4-HYDROXY-6-METHYLOL PTERIDINE

Joseph Semb, Pearl River, N. Y., assignor to American Cyanamid Company, New York, N. Y., a corporation of Maine No Drawing. Application December 10, 1946, Serial No. 715,332

6 Claims. (Cl. 260—251.5)

This invention relates to a new chemical compound and to a process of preparing it.

The new compound is believed to have the formula:

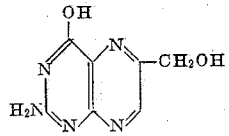

As such it may be called 2-amino-4-hydroxy-6-methylol pteridine. The product, like other pteridines, has no definite melting point. It has a light yellow color, is slightly soluble in water, and more soluble in alkaline solutions. In 0.1 N sodium hydroxide solutions it exhibits characteristic ultra violet absorption maxima at 2,525 Å units and 3,650 Å units and minima at 2,325 Å units and 3,000 Å units. The product is useful as an intermediate in the synthesis of pteroylglutamic acid and other products having vitamin and anti-vitamin properties.

Although I have not yet definitely ascertained the exact nature of the mechanism of the reaction by which this new product is formed, it appears most likely to be in accordance with the following equation:

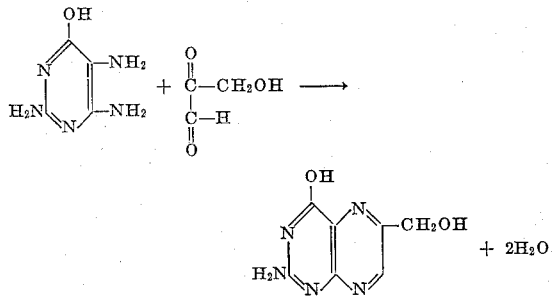

Of the intermediates, 2,4,5-triamino-6-hydroxy pyrimidine is a well known substance, the preparation of which has been described in the literature. As is known, this compound may exist in one or more tautomeric forms. It may be used as such in the reaction or in the form of one of its acid salts, such as the dihydrochloride, in which form it is more water soluble and therefore more easily handled.

The other intermediate, hydroxypyruvaldehyde, or hydroxymethylglyoxal, appears to be an unstable substance and is probably formed in the reaction mixture by hydrolysis of dibromoacetonylphthalimide or the like as described in part by Gabriel Ber., vol. 44, pages 1908–9, (1911). The formation of the intermediate by the reaction may be illustrated by the following equations:

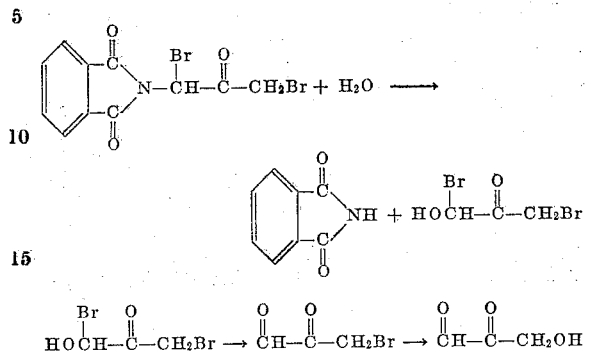

These reactions probably take place by mere heating of the dibromoacetonylpthalimide in water.

The new process of the present invention will take place over a wide range of pH conditions, but it is preferred to operate on the alkaline side from about pH 7 to 10 or higher. Water is the preferred solvent for the reaction, although the use of other solvents or diluents is not precluded. The reaction takes place easily and rapidly at ordinary room temperatures.

In order that the nature of the process will be better understood, the following example is given. It will be understood that the conditions recited are merely representative and the process is not restricted to the exact details thereof. All parts are by weight unless otherwise indicated.

Example 50 parts of dibromoacetonylpthalimide was boiled for one hour in 200 parts of water. The solution was cooled and filtered, 100 grams of sodium bisulfite added, and the solution then adjusted to a pH of 8 with caustic soda. The use of sodium bisulfite is not critical in this process but appears to result in the formation of better crystals of the product.

A solution of 42½ parts of 2,4,5-triamino-6-hydroxy pyrimidine dihydrochloride in 500 parts of water was prepared and added slowly over a period of 45 minutes to the above solution of the dibromoacetonylpthalimide. During the addition the pH was maintained at about 8. The reaction mixture was filtered, and the precipitate washed with water and alcohol and dried.

The 17 parts of crude pteridine which was obtained by the above procedure was dissolved in 250 parts of dilute sodium hydroxide solution, treated with a small amount of activated charcoal, and filtered. The alkaline solution was then added slowly to 20,000 parts of water at 80–85° C. containing 25 parts of acetic acid. The solution was then allowed to cool to 40° C. and filtered. The filtrate was placed in a cold room over night and the product which separated was recovered. It was then dissolved in 100 parts of dilute sodium hydroxide solution, treated with activated charcoal, and filtered. The filtrate was then added to 1,800 parts of water at 85° C. containing 5 parts of acetic acid. After cooling a few degrees the solution was filtered and then cooled to 0° C., whereupon the product 2-amino-4-hydroxy-6-methylol pteridine was precipitated. After washing with water and then with acetone, the material was dried and analyzed for carbon, hydrogen, and nitrogen. The found values checked very closely with the theoretical values.

I claim:

1. A method which comprises the step of bringing together under reactive conditions 2,4,5-triamino-6-hydroxy pyrimidine and hydroxypyruvaldehyde and recovering 2-amino-4-hydroxy-6-methylol pteridine.

2. A method which comprises the step of bringing together in aqueous solution under alkaline conditions 2,4,5-triamino-6-hydroxy pyrimidine and hydroxypyruvaldehyde and recovering 2-amino-4-hydroxy-6-methylol pteridine.

3. The method which comprises heating an aqueous solution of dibromoacetonylpthalimide and adding thereto 2,4,5-triamino - 6 - hydroxypyrimidine, whereby 2 - amino - 4 - hydroxy - 6-methylol pteridine is formed, and recovering the said product.

4. A method which comprises heating an aqueous solution of dibromoacetonylpthalimide and thereafter adding thereto while maintaining the hydrogen ion concentration within the range pH 7 to pH 10 an aqueous solution of 2,4,5-triamino-6-hydroxy pyrimidine, whereby 2-amino-4-hydroxy-6-methylol pteridine is formed, and recovering the said 2 - amino - 4 - hydroxy - 6-methylol pteridine.

5. A method which comprises heating an aqueous solution of dibromoacetonylpthalimide, cooling said solution and separating therefrom pthalimide, adding to the aqueous solution while maintaining the hydrogen ion concentration within the range pH 7 to pH 10 an aqueous solution of 2,4,5-triamino-6-hydroxy pyrimidine, whereby 2-amino-4-hydroxy-6-methylol pteridine is formed, and recovering the said 2-amino - 4 - hydroxy - 6-methylol pteridine.

6. A method which comprises heating an aqueous solution of dibromoacetonylpthalimide, cooling said solution and separating therefrom pthalimide, adding sodium bisulfite, and then adding to the aqueous solution while maintaining the hydrogen ion concentration within the range pH 7 to pH 10 an aqueous solution of 2,4,5-triamino-6-hydroxy pyrimidine, whereby 2-amino-4-hydroxy-6-methylol pteridine is formed, and recovering the said 2-amino-4-hydroxy-6-methylol pteridine.

JOSEPH SEMB.

No references cited.